(12) United States Patent
McGill et al.

(10) Patent No.: US 11,458,994 B2
(45) Date of Patent: Oct. 4, 2022

(54) SYSTEMS AND METHODS FOR SEMI-AUTONOMOUSLY CONTROLLING A VEHICLE

(71) Applicant: Toyota Research Institute, Inc., Los Altos, CA (US)

(72) Inventors: Stephen G. McGill, Broomall, PA (US); Guy Rosman, Newton, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 277 days.

(21) Appl. No.: 16/834,497

(22) Filed: Mar. 30, 2020

(65) Prior Publication Data

US 2021/0300422 A1    Sep. 30, 2021

(51) Int. Cl.
| | |
|---|---|
| *B60W 60/00* | (2020.01) |
| *B60W 40/08* | (2012.01) |
| *B60W 30/095* | (2012.01) |
| *B60W 30/09* | (2012.01) |

(Continued)

(52) U.S. Cl.
CPC ........ *B60W 60/0016* (2020.02); *B60W 30/09* (2013.01); *B60W 30/095* (2013.01); *B60W 40/08* (2013.01); *B60W 60/0025* (2020.02); *G05B 13/027* (2013.01); *G06N 3/088* (2013.01); *B60W 2540/30* (2013.01)

(58) Field of Classification Search
CPC ............. B60W 60/0016; B60W 30/09; B60W 30/095; B60W 40/08; B60W 60/0025; B60W 2540/30; G05B 13/027; G06N 3/088
See application file for complete search history.

(56) References Cited

U.S. PATENT DOCUMENTS

| | | | |
|---|---|---|---|
| 8,849,494 B1 | 9/2014 | Herbach et al. | |
| 9,248,834 B1 * | 2/2016 | Ferguson | B60W 60/0027 |
| 9,465,388 B1 | 10/2016 | Fairfield et al. | |

(Continued)

OTHER PUBLICATIONS

Huang, Xin, et al. "Uncertainty-aware driver trajectory prediction at urban intersections." 2019 International conference on robotics and automation (ICRA). IEEE, 2019. (Year: 2019).*

(Continued)

*Primary Examiner* — Abdhesh K Jha
*Assistant Examiner* — Andrew Sang Kim
(74) *Attorney, Agent, or Firm* — Dinsmore & Shohl LLP

(57) ABSTRACT

Systems and methods for semi-autonomously controlling a vehicle are disclosed. In one embodiment, a method includes determining a trajectory of a semi-autonomous vehicle based on data received from one or more vehicle sensors, determining a state of the vehicle based on data received from the vehicle sensors, determining an optimal trajectory of the vehicle based on the state of the vehicle, determining a level of confidence in the determined state of the vehicle and in the determined optimal trajectory of the vehicle, determining a plurality of possible future states of the vehicle based on the state of the vehicle, the trajectory of the vehicle, and the level of confidence, determining whether a subset of the possible future states of the vehicle are recoverable, and when it is determined that the subset of the possible future states of the vehicle are recoverable, issuing a security certificate.

12 Claims, 5 Drawing Sheets

(51) Int. Cl.
*G05B 13/02* (2006.01)
*G06N 3/08* (2006.01)

(56) References Cited

U.S. PATENT DOCUMENTS

| | | |
|---|---|---|
| 10,282,623 B1 | 5/2019 | Ziyaee et al. |
| 10,466,694 B1 | 11/2019 | Fairfield et al. |
| 2019/0258251 A1 | 8/2019 | Ditty et al. |
| 2019/0286153 A1 | 9/2019 | Rankawat et al. |
| 2020/0180611 A1* | 6/2020 | Klingemann ......... B60W 50/14 |

OTHER PUBLICATIONS

Amini, Alexander, et al. "Variational autoencoder for end-to-end control of autonomous driving with novelty detection and training de-biasing." 2018 IEEE/RSJ International Conference on Intelligent Robots and Systems (IROS). IEEE, 2018. (Year: 2018).*

Fisac, Jaime, et al. "Probabilistically Safe Robot Planning with Confidence-Based Human Predictions" arXiv:1806.00109v1 [cs. RO] May 31, 2018 (Year: 2018).*

AiOTA Labs, "Quantifying Accuracy and Soflmax Prediction Confidence for Making Safe and Reliable Deep Neural Network Based AI System", Jan. 24, 2019, 10 pages, https://blog.usejournal.com/quantifying-accuracy-and-softmax-prediction-confidence-for-makingsafe-and-reliable-deep-neural-6dbb8e360e15.

Malcom Owen, "Apple Self-Driving Car Could Use 'Confidence' Algorithm to Speed Up Sensor Processing & Decision-Making", May 7, 2019, 4 pages, https://appleinsider.com/articles/19/05/07/apple-self-driving-car-could-use-confidence-algorithm-tospeed-up-sensor-processing-decision-making.

* cited by examiner

SYSTEMS AND METHODS FOR SEMI-AUTONOMOUSLY CONTROLLING A VEHICLE

TECHNICAL FIELD

The present specification relates to semi-autonomous vehicles, and more particularly, to methods and vehicle systems for semi-autonomous vehicles that issue a certificate for neural network confidence.

BACKGROUND

In a semi-autonomous vehicle, the vehicle may have two modes of operation. Namely, a manual driving mode, in which the vehicle is controlled manually by a human driver, and autonomous driving mode, in which the vehicle is controlled autonomously by a vehicle system. When a semi-autonomous vehicle is in manual driving mode, a vehicle computer monitors human control of the vehicle. When human control of the vehicle is satisfactory, the vehicle computer does not intervene in the driving of the vehicle. However, when the vehicle computer determines that human control of the vehicle is unsatisfactory and predicts an undesirable trajectory of the vehicle, the vehicle may enter autonomous driving mode and temporarily take over control of the vehicle in order to take remedial action and correct the trajectory of the vehicle.

The vehicle computer may monitor human control of the vehicle by monitoring a plurality of inputs, such as steering wheel angle, vehicle speed, inputs from vehicle cameras, inputs from a Lidar system, and the like. Based on these inputs, the vehicle computer may determine whether the vehicle trajectory is satisfactory under human control or whether autonomous driving should be implemented. However, in certain situations, the vehicle computer may be unable to predict the vehicle trajectory, for example, due to blocked cameras, faulty input signals, and the like. In these situations, it may be difficult for the vehicle computer to determine whether to take autonomous control of the vehicle. As such, there is a need for a semi-autonomous vehicle system that is able to determine whether to implement autonomous control of a vehicle when there is uncertainty about the trajectory of the vehicle.

SUMMARY

In one embodiment, a method may include determining a trajectory of a semi-autonomous vehicle based on a first set of data received from one or more vehicle sensors, determining a state of the vehicle based on a second set of data received from the vehicle sensors, determining an optimal trajectory of the vehicle based on the state of the vehicle, determining a level of confidence in the determined state of the vehicle and in the determined optimal trajectory of the vehicle, determining a plurality of possible future states of the vehicle based on the state of the vehicle, the trajectory of the vehicle, and the level of confidence, determining whether a subset of the possible future states of the vehicle are recoverable, and when it is determined that the subset of the possible future states of the vehicle are recoverable, issuing a security certificate.

In another embodiment, a vehicle system for a semi-autonomous vehicle may include one or more vehicle sensors, one or more processors, one or more memory modules, and machine readable instructions stored in the one or more memory modules that, when executed by the one or more processors, cause the vehicle system to determine a trajectory of the semi-autonomous vehicle based on a first set of data received from vehicle sensors, determine a state of the vehicle based on a second set of data received from the vehicle sensors, determine a state of the vehicle based on a second set of data received from the vehicle sensors, determine an optimal trajectory of the vehicle based on the state of the vehicle, determine a level of confidence in the determined state of the vehicle and in the determined optimal trajectory of the vehicle, determine a plurality of possible future states of the vehicle based on the state of the vehicle, the trajectory of the vehicle, and the level of confidence, determine whether a subset of the possible future states of the vehicle are recoverable, and when it is determined that the subset of the possible future states of the vehicle are recoverable, issue a security certificate.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for determining when a semi-autonomous vehicle should implement autonomous control of the vehicle to correct the trajectory of the vehicle in the face of uncertainty about the vehicle's trajectory. Specifically, a vehicle system may predict a trajectory of the vehicle along with a confidence about that prediction, and a confidence certificate may be issued when the confidence about the predicted trajectory is sufficient that autonomous control of the vehicle need not be implemented.

Figure 1:
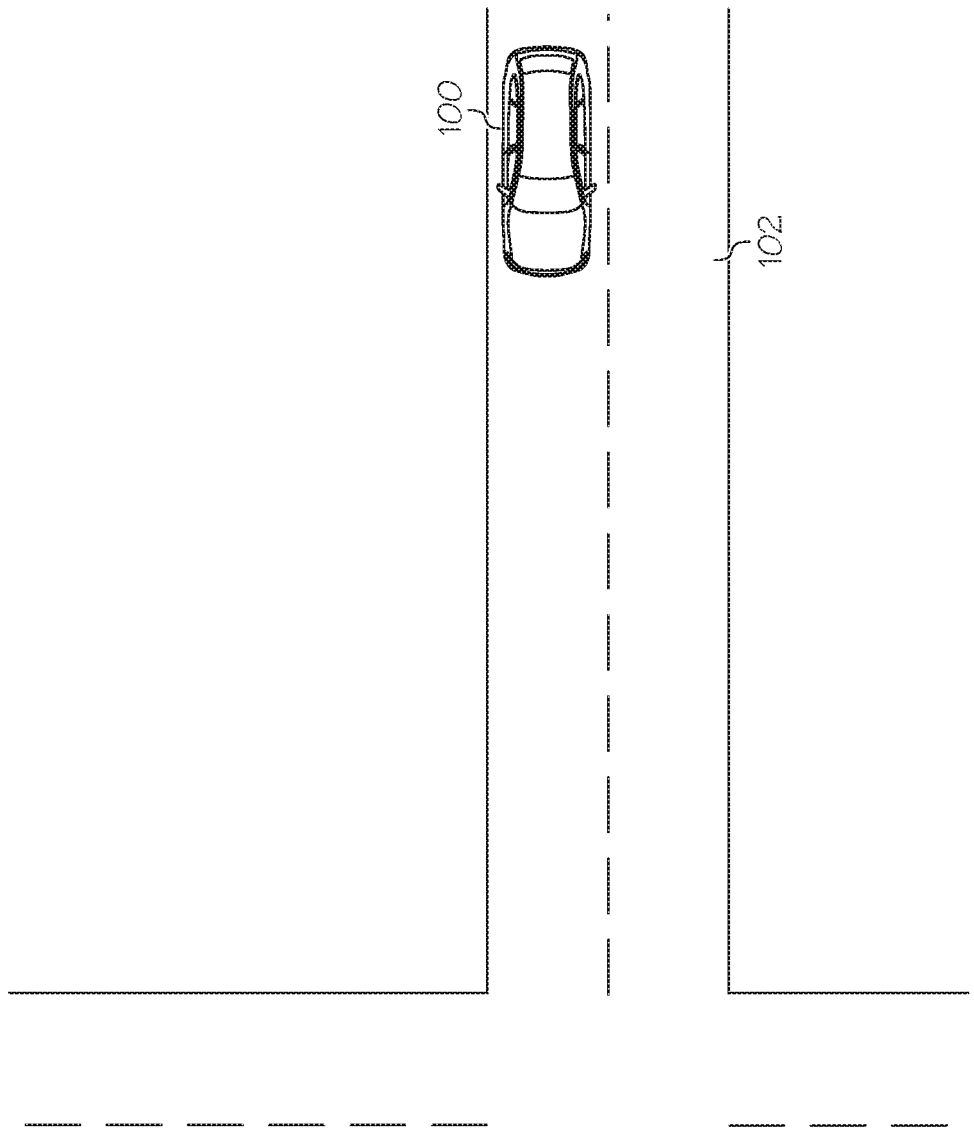
FIG. 1 schematically depicts operation of a semi-autonomous vehicle, according to one or more embodiments shown and described herein.

FIG. 1 schematically depicts a semi-autonomous vehicle 100 driving along a road 102. In normal operation, the vehicle 100 is controlled by a human driver. However, the vehicle 100 is monitored by a vehicle system, which receives a variety of inputs about the state of the vehicle. Based on these inputs, the vehicle system may predict a future trajectory of the vehicle. If the predicted trajectory of the vehicle is unsatisfactory (e.g., likely to result in a crash or other undesirable outcome), the vehicle system may enter an autonomous driving mode, in which the vehicle is controlled autonomously without control by the human driver, in order to correct the trajectory of the vehicle and prevent the undesirable outcome.

Figure 2:
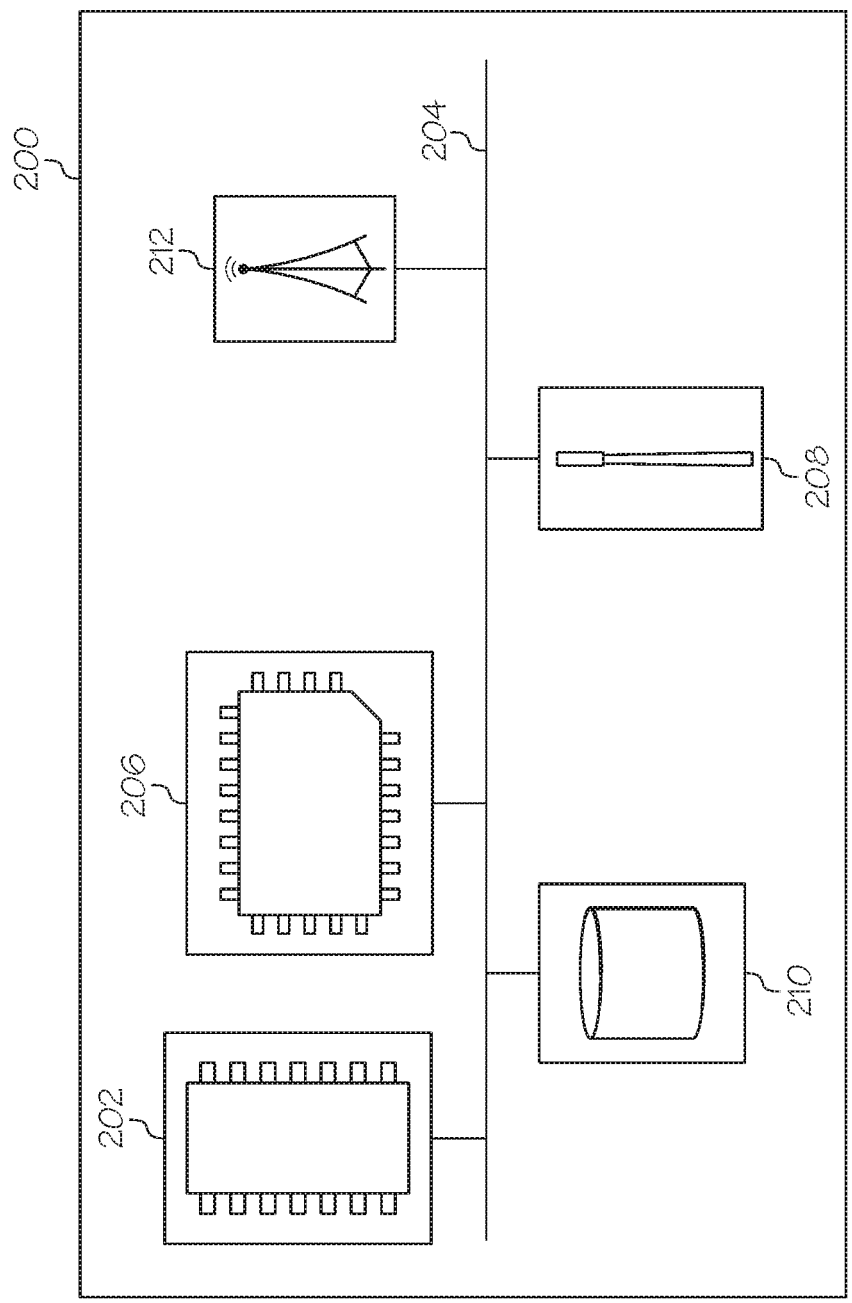
FIG. 2 depicts a schematic diagram of an example vehicle system for a semi-autonomous vehicle, according to one or more embodiments shown and described herein.

FIG. 2 depicts an example vehicle system 200 included in the vehicle 100 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the vehicle 100. These modules are not shown in FIG. 2 for brevity. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 are discussed in further detail below with respect to FIG. 3.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 100 to monitor its location.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. The vehicle sensors 210 may also monitor the state of the vehicle 100 including the speed of the vehicle, the angle of the steering wheel, and the like. The vehicle sensors 210 may be used to navigate the semi-autonomous vehicle 100 when the vehicle 100 is in autonomous driving mode.

Still referring to FIG. 2, the vehicle system 200 comprises network interface hardware 212 for communicatively coupling the vehicle system 200 to the one or more remote computing devices. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In some examples, the network interface hardware 212 of the vehicle system 200 may transmit data recorded by the vehicle sensors 210 to a remote computing device that may predict a trajectory of the vehicle 100 and/or determine a confidence of that prediction.

Figure 3:
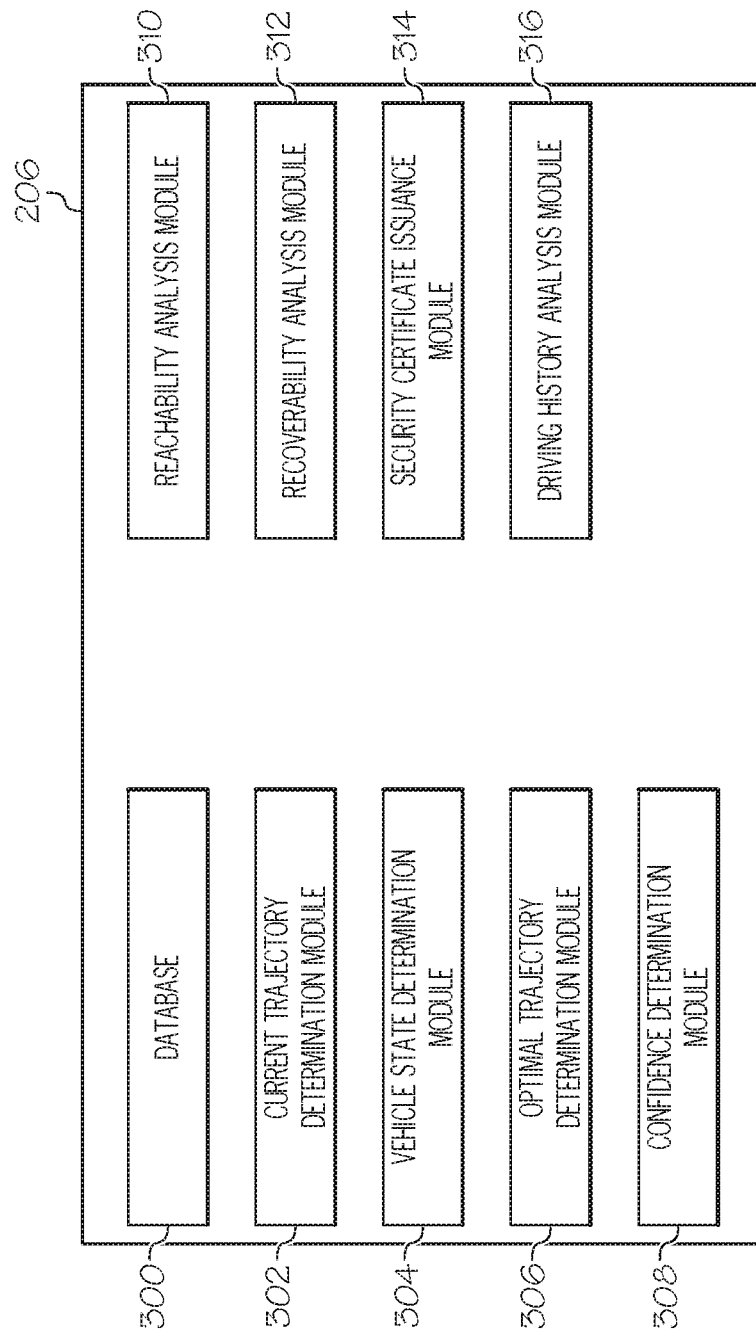
FIG. 3 depicts a schematic diagram of example memory modules of the vehicle system of FIG. 2, according to one or more embodiments shown and described herein.

Now referring to FIG. 3, the one or more memory modules 206 of the vehicle system 200 include a database 300, a current trajectory determination module 302, a vehicle state determination module 304, an optimal trajectory determination module 306, a confidence determination module 308, a reachability analysis module 310, a recoverability analysis module 312, a security certificate issuance module 314, and a driving history analysis module 316. Each of the database 300, the current trajectory determination module 302, the vehicle state determination module 304, the optimal trajectory determination module 306, the confidence determination module 308, the reachability analysis module 310, the recoverability analysis module 312, the security certificate issuance module 314, and the driving history analysis module 316 may be a program module in the form of operating systems, application program modules, and other program modules stored in one or more memory modules 206. In some embodiments, the program module may be stored in a remote storage device that may communicate with the vehicle system 200. Such a program module may include, but is not limited to, routines, subroutines, programs, objects, components, data structures and the like for performing specific tasks or executing specific data types as will be described below.

The database 300 may temporarily store data received from the vehicle sensors 210. As explained above, the data received from the vehicle sensors 210 may include information about the speed of the vehicle and the position of the steering wheel, as well as other data regarding vehicle components. The data received from the vehicle sensors 210 may also include data related to the external environment of the vehicle 100, including external camera images, Lidar data, and the like. In some examples, the vehicle sensors 210 may also record data about the state of the driver (e.g., images from one or more internal cameras) or other factors affecting the traveling state of the vehicle 100. Any such data received from the vehicle sensors 210 may be stored in the database 300. The database 300 may also store data related to past driver behavior, as explained in further detail below.

The current trajectory determination module 302 may determine the current trajectory of the vehicle 100 based on the data gathered by the vehicle sensors 210. As a non-limiting example, the speed of the vehicle 100 and the angle of the steering wheel may be used to determine the current trajectory of the vehicle 100. In some examples, the current trajectory determination module 302 may determine the current trajectory of the vehicle 100 based on simulated data. The current trajectory determination module 302 may continually determine the trajectory of the vehicle 100. In one non-limiting example, the current trajectory determination module 302 determines the trajectory of the vehicle 100 every 100 ms. That is, the current trajectory determination module 302 operates with a frequency of 10 Hz. In other examples, the current trajectory determination module 302 may determine the trajectory of the vehicle 100 with a greater or lesser frequency. The other memory modules 206 of the vehicle system 200 may operate continually with the same frequency as the current trajectory determination module 302.

The vehicle state determination module 304 may determine a state of the vehicle 100, such as features of the environment surrounding the vehicle 100 and the position of the vehicle 100 within the environment. Specifically, the vehicle state determination module 304 may analyze external vehicle images, Lidar data, or other data captured by the vehicle sensors 210 to determine the external environment of the vehicle 100 and the position of the vehicle 100 with respect to the environment (e.g., where the vehicle 100 is on the road 102). In some examples, the vehicle state determination module 304 may determine a state of the vehicle 100 based on simulated data. After determining a state of the vehicle 100, the vehicle state determination module 304 may store the determined state along with a timestamp indicating the time the state was measured in the database 300. This allows a time-series record of vehicle states to be recorded, which may be used by the vehicle system 200 as discussed below.

The optimal trajectory determination module 306 may determine an optimal trajectory of the vehicle 100 based on the state of the vehicle 100 determined by the vehicle state determination module 304. Specifically, the optimal trajectory determination module 306 may determine an optimal trajectory for the vehicle 100 based on the position of the vehicle 100 with respect to the external environment (e.g., a trajectory that most safely drives the vehicle along a particular route). For example, if the vehicle 100 is drifting towards the right edge of the road 102, in the example of FIG. 1, the optimal trajectory determination module 306 may determine that the optimal trajectory is one that veers to the left back towards the center of the road 102. The determined optimal trajectory may include an optimal direction of the vehicle 100 as well as an optimal speed of the vehicle 100. The optimal trajectory determination module 306 may also determine a vehicle state needed to implement the determined optimal trajectory (e.g., the necessary steering wheel angle, application of the accelerator or brake pedals, and use of turn signals).

If the optimal trajectory is different from the current trajectory, it may be desirable for the vehicle 100 to enter autonomous driving mode to correct the trajectory. However, if there is uncertainty in the determined optimal trajectory, then it may be unnecessary for the vehicle 100 to enter autonomous driving mode. As such, entering autonomous driving mode unnecessarily may upset the driver and may not be desirable, as discussed in further detail below.

The confidence determination module 308 may determine a level of confidence in the determinations made by the vehicle state determination module 304 and the optimal trajectory determination module 306. The determinations made by these modules may not be accurate for a number of reasons. For example, there may be obstructions of one or more of the vehicle sensors 210 or errors in the data recorded by one or more of the vehicle sensors 210, which may result in uncertainty as to the position of the vehicle or the external environment. In addition, even if the state of the vehicle is known, there may be uncertainty as to the optimal trajectory of the vehicle. Thus, the confidence determination module 308 may determine a level of confidence in the state of the vehicle determined by the vehicle state determination module 304 and the trajectory determined by the optimal trajectory determination module 306.

In one non-limiting example, the confidence determination module 308 uses an autoencoder to determine a level of confidence of the determined optimal trajectory. An autoencoder used by the confidence determination module 308 may be a neural network having an input layer that receives data collected by the vehicle sensors 210, one or more hidden layers having a number of nodes less than the number of nodes of the input layer, and an output layer having the same number of nodes as the input layer. The neural network may be trained to reproduce the input layer as closely as possible, despite the dimensionality reduction of the one or more hidden layers.

Once the neural network is trained as an autoencoder, it may be used by the confidence determination module 308. Specifically, the confidence determination module 308 may feed the data determined by the vehicle sensors 210 into the trained neural network, and the neural network may output a predicted representation of the input data. The confidence determination module 308 may determine a confidence of the trajectory determined by the optimal trajectory determination module 306 based on a similarity between the output of the neural network and the input to the neural network (e.g., based on a squared error difference between the output layer and the input layer).

If the determined optimal trajectory suggests that remedial action by autonomous driving is recommended (e.g., the optimal trajectory differs significantly from the current trajectory), and confidence of the state of the vehicle and the optimal trajectory is high, it may be desirable for the vehicle 100 to enter autonomous driving mode and correct the vehicle trajectory. However, if the confidence of the determined state and optimal trajectory is low, it may be preferable to wait until confidence is higher before taking such action in order to avoid unnecessarily taking control away from the driver and thereby upsetting the driver. Thus, when the confidence determined by the confidence determination module 308 is low, the vehicle system 200 may take remedial action only if the risk of a crash is high.

As explained above, the memory modules 206 continually operate at a certain frequency (e.g., 10 Hz). Thus, with every cycle of operation (e.g., every 10 ms), new determinations are made of the optimal trajectory and confidence level. Accordingly, even if the optimal trajectory determination module 306 determines that the optimal trajectory of the vehicle 100 is significantly different from the current trajectory, remedial action may not be necessary if the current trajectory is unlikely to lead to a crash or other undesirable outcome before the next cycle. If the current trajectory is unlikely to lead to a crash before the next cycle and the confidence level is low, then the vehicle system 200 may allow manual driving to continue until the next cycle of the memory modules 206. At the next cycle, a fresh determination may be made based on updated data. The likelihood of a crash without autonomous driving intervention may be determined using the techniques described below.

The reachability analysis module 310 may determine states of reachability by the vehicle 100 if autonomous driving mode is not entered and the vehicle is continued to be controlled by a human driver. That is, the reachability analysis module 310 may determine a range of possible future vehicle states of the vehicle based on the current state and trajectory of the vehicle and the determined confidence level. In embodiments, the reachability analysis module 310 determines a range of possible vehicle states that may be achieved within the next cycle of operation of the memory modules 206 (e.g., within the next 100 ms for a frequency of 10 Hz). In some examples, the reachability analysis module 310 may determine a range of possible vehicle states that may be achieved within the next two or more cycles of operation of the memory modules 206.

In one example, the reachability analysis module 310 may determine a Gaussian distribution of possible states that may be reached by the vehicle 100 in the next cycle of operation of the memory modules 206. The Gaussian distribution of possible states may be determined based on the current state of the vehicle 100 as determined by the vehicle state determination module 304, the current trajectory of the vehicle 100 as determined by the current trajectory determination module 302, and the confidence level determined by the confidence determination module 308. Specifically, the lower the confidence level is in the current state of the vehicle 100, the greater the range of possible future states is. For example, the less certainty there is in where the vehicle 100 currently is, the wider the range of possibilities there are of where the vehicle 100 may be in the future. In some examples, the reachability analysis module 310 stores the determined possible vehicle states in the database 300 for later use, as discussed below.

The recoverability analysis module 312 determines whether the vehicle 100 will be able to recover from some or all of the possible states determined by the reachability analysis module 310 without the vehicle 100 crashing or having another undesirable outcome. As explained above, the reachability analysis module 310 determines a range of possible future states (e.g., possible states at the next cycle of operation of the memory modules 206) based on the current state and trajectory of the vehicle and the confidence or uncertainty of those determinations. The recoverability analysis module 312 considers the most likely of those states and determines whether those most likely states can be recovered from at the next cycle if no remedial action is taken during the current cycle.

In one example, where the reachability analysis module 310 determines a Gaussian distribution of possible future states of the vehicle 100, the recoverability analysis module 312 may analyze all of the possible states within two standard deviations of the mean. In other examples, the recoverability analysis module 312 may analyze a different range of possible states determined by the reachability analysis module 310 (e.g., within three standard deviations of the mean). The number of standard deviations of states analyzed by the recoverability analysis module 312 may be a hyperparameter that can be set or modified by a user. In other examples where the reachability analysis module 310 determines possible states in a manner other than a Gaussian distribution, other methods of selecting a number of those possible states to analyze may be utilized by the recoverability analysis module 312. In some examples, the recoverability analysis module 312 may analyze all of the possible future states determined by the reachability analysis module 310.

After selecting a number of possible future vehicle states to analyze, the recoverability analysis module 312 determines, for each of the possible future states to be analyzed, whether the vehicle 100 could recover from the future vehicle state. That is, the recoverability analysis module 312 may determine whether a possible state of the vehicle 100 at the next cycle would likely result in a crash or other undesirable outcome even if autonomous driving mode is entered at the next cycle to take remedial action to avoid such a crash. In many possible future vehicle states, even though the vehicle 100 is getting closer to a crash, there would still be sufficient time for the vehicle to take corrective action at the next cycle to avoid a crash. In one example, the recoverability analysis module 312 determines that a vehicle state is recoverable if the probability of that vehicle state leading to a crash is less than a predetermined threshold. This threshold may be a hyperparameter that may be set by a user.

If the recoverability analysis module 312 determines that all of the analyzed possible states of the vehicle 100 at the next cycle are recoverable (e.g., remedial action could be taken at the next cycle to avoid a crash), then the security certificate issuance module 314 issues a security certificate. The security certificate indicates that no bad outcome is likely to occur before the next cycle of operation of the memory modules 206 and thus, it is not necessary for the vehicle 100 to enter autonomous driving mode during the current cycle. If the recoverability analysis module 312 determines that one or more of the analyzed possible states of the vehicle 100 at the next cycle are not recoverable (e.g., a future state is likely to result in a crash), then a security certificate is not issued.

In one example, if a security certificate is not issued, the vehicle system 200 enters autonomous driving mode and causes the vehicle 100 to follow the trajectory determined by the optimal trajectory determination module 306. In other examples, if a security certificate is not issued, the vehicle system 200 analyzes the past behavior of the driver, as discussed below, before determining whether to enter autonomous driving mode.

If a security certificate is not issued, the driving history analysis module 316 analyzes recent driving history of the driver of the vehicle 100. Specifically, the driving history analysis module 316 may determine whether the recent driving history of the driver is satisfactory (e.g., above a threshold of acceptable performance). When a security certificate is not issued, it is possible that the trajectory of the vehicle 100 is such that it may enter a vehicle state within the next cycle of operation of the memory modules 206 that may lead to a crash. Thus, it may be desirable to take remedial action to correct the trajectory of the vehicle 100. However, if the confidence level determined is low (e.g., because some of the vehicle sensors 210 are occluded), the optimal trajectory of the vehicle 100 determined by the optimal trajectory determination module 306 may not be accurate. In this case, it may be better to let the driver continue to operate the vehicle rather than for the vehicle system 200 to enter autonomous driving mode. However, if the recent driving history of the driver is poor, it may be better for the vehicle system 200 to enter autonomous driving mode to correct the vehicle trajectory.

The driving history analysis module 316 may analyze the recent driving history by analyzing the recent vehicle states stored in the database 300. The time period constituting the recent driving history analyzed by the driving history analysis module 316 may be a hyperparameter set by a user (e.g., five minutes). The driving history analysis module 316 determines whether the past vehicle states stored in the database 300 represent dangerous vehicle states (e.g., vehicle states that are likely to lead to a cash). Vehicle states that are likely to lead to a crash may be learned from past vehicle state data (e.g., using supervised learning techniques).

In one example, the driving history analysis module 316 may determine whether a number of past vehicle states greater than a predetermined threshold comprise dangerous vehicle states. The predetermined threshold may be a hyperparameter that may be set by a user. If the number of past vehicle states that comprise dangerous vehicle states is less than the predetermined threshold, the driving history analysis module 316 may determine that the recent driving history of the driver of the vehicle 100 is satisfactory. If the number of past vehicle states that comprise dangerous vehicle states is greater than or equal to the predetermined threshold, the driving history analysis module 316 may determine that the recent driving history of the driver is not satisfactory.

In another example, the driving history analysis module 316 may compare recent past vehicle states to the possible vehicle states determined by the reachability analysis module 310. That is, the driving history analysis module 316 may look at the possible future vehicle states determined by the reachability analysis module 310 at a particular time t (e.g., the possible vehicle states at a time t+1) and compare those possible states to the actual vehicle state at time t+1. If the actual vehicle states are consistently close to the mean of the possible vehicle states, the driving history analysis module 316 may determine that the recent driving history of the driver is satisfactory. However, if the actual vehicle states are consistently near the edge of the reachability analysis (e.g., the number of actual vehicle states greater than one standard deviation from the mean vehicle state is above a threshold), then the driving history analysis module 316 may determine that the recent driving history of the driver is not satisfactory.

If the driving history analysis module 316 determines that the recent driving history of the driver of the vehicle 100 is satisfactory, then the vehicle system 200 may allow the driver to continue driving the vehicle 100 until the next cycle of the memory modules 206, at which point a new consideration will be made with updated data. However, if the driving history analysis module 316 determines that the recent driving history of the driver of the vehicle 100 is not satisfactory, then the vehicle system 200 may enter autonomous driving mode and the vehicle trajectory may be changed to the trajectory determined by the optimal trajectory determination module 306.

Figure 4:
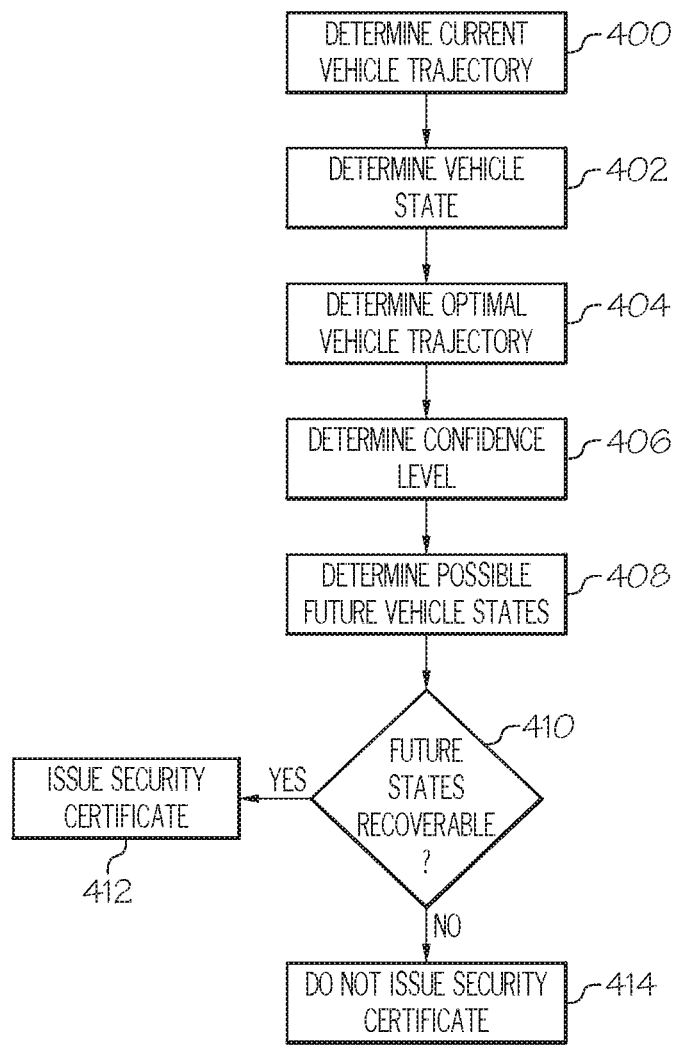
FIG. 4 depicts a flowchart of an example method for determining whether to issue a security certificate, according to one or more embodiments shown and described herein.

FIG. 4 depicts a flowchart of an example method for determining when to issue a security certificate, according to one or more embodiments shown and described herein. At step 400, the current trajectory determination module 302 determines the current trajectory of the vehicle 100 based on data recorded by the vehicle sensors 210. At step 402, the vehicle state determination module 304 determines a current state of the vehicle 100 (e.g., a position of the vehicle 100 with respect to its surrounding environment).

At step 404, the optimal trajectory determination module 306 determines an optimal trajectory of the vehicle 100 based on the state of the vehicle determined by the vehicle state determination module 304. At step 406, the confidence determination module 308 determines a confidence level for the vehicle state determined by the vehicle state determination module 304 and the optimal trajectory determined by the optimal trajectory determination module 306. At step 408, the reachability analysis module 310 determines possible future vehicle states based on the vehicle state determined by the vehicle state determination module 304 and the vehicle trajectory determined by the current trajectory determination module 302.

At step 410, the recoverability analysis module 312 determines whether all of the vehicle states among a subset of the possible future vehicle states determined by the reachability analysis module 310 are recoverable (e.g., whether a crash is likely to occur if a vehicle state is reached). If the recoverability analysis module 312 determines that all of the vehicle states among the subset of the possible future vehicle states are recoverable (Yes at step 410), then at step 412, the security certificate issuance module 314 issues a security certificate. Alternatively, if the recoverability analysis module 312 determines that some of the vehicle states among the subset of the possible future vehicle states are not recoverable (No at step 410), then at step 414, a security certificate is not issued.

Figure 5:
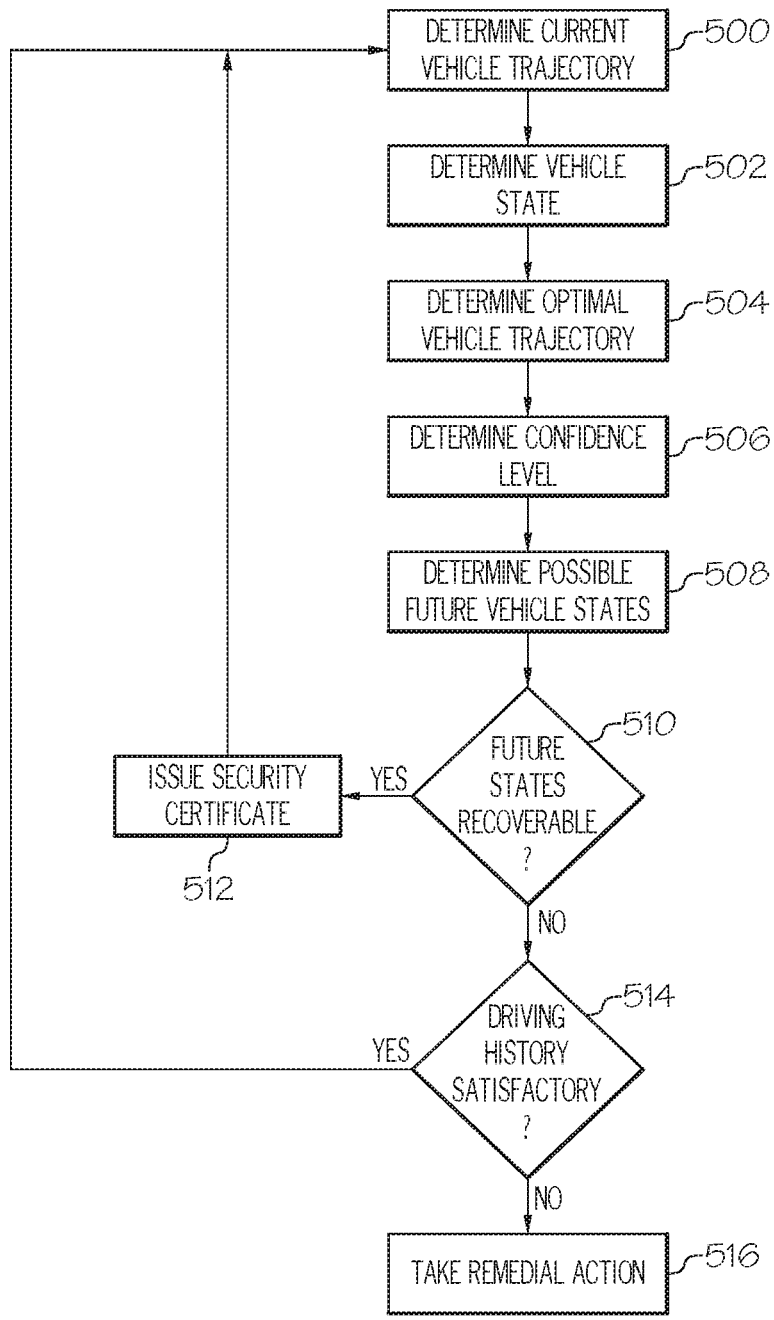
FIG. 5 depicts a flowchart of an example for determining whether a semi-autonomous vehicle should enter autonomous driving mode, according to one or more embodiments shown and described herein.

FIG. 5 depicts a flowchart of an example method for determining whether the vehicle system 200 should take remedial action to correct the trajectory of the vehicle 100. At step 500, the current trajectory determination module 302 determines the current trajectory of the vehicle 100 based on data recorded by the vehicle sensors 210. At step 502, the vehicle state determination module 304 determines a current state of the vehicle 100 (e.g., a position of the vehicle 100 with respect to its surrounding environment).

At step 504, the optimal trajectory determination module 306 determines an optimal trajectory of the vehicle 100 based on the state of the vehicle determined by the vehicle state determination module 304. At step 506, the confidence determination module 308 determines a confidence level for the vehicle state determined by the vehicle state determination module 304 and the optimal trajectory determined by the optimal trajectory determination module 306. At step 508, the reachability analysis module 310 determines possible future vehicle states based on the vehicle state determined by the vehicle state determination module 304 and the vehicle trajectory determined by the current trajectory determination module 302.

At step 510, the recoverability analysis module 312 determines whether all of the vehicle states among a subset of the possible future vehicle states determined by the reachability analysis module 310 are recoverable (e.g., whether a crash is likely to occur if a vehicle state is reached). If the recoverability analysis module 312 determines that all of the vehicle states among the subset of the possible future vehicle states are recoverable (Yes at step 410), then at step 512, the security certificate issuance module 314 issues a security certificate. Control then returns to step 500 at the next cycle of operation of the memory modules 206.

If the recoverability analysis module 312 determines that some of the vehicle states among the subset of the possible future vehicle states are not recoverable (No at step 510), then at step 514, the driving history analysis module 316 determines whether the recent driving history of the driver of the vehicle 100 is satisfactory. If the driving history analysis module 316 determines that the recent driving history of the driver of the vehicle 100 is satisfactory (Yes at step 514), then the vehicle system 200 remains in manual driving mode and control returns to step 500 at the next cycle of operation of the memory modules 206. Alternatively, if the driving history analysis module 316 determines that the recent driving history of the driver of the vehicle 100 is not satisfactory (No at step 514), then the vehicle system 200 takes remedial action by switching to autonomous driving mode and causing the vehicle 100 to implement the trajectory determined by the optimal trajectory determination module 306.

It should now be understood that embodiments described herein are directed to systems and methods for determining whether a semi-autonomous vehicle should enter autonomous driving mode to correct a vehicle trajectory when in manual driving mode. A current state and trajectory of a vehicle may be determined and an optimal trajectory of the vehicle may be determined based on the current state. A confidence of the determined state and trajectories may also be determined.

A set of possible future vehicle states may be determined based on the current state and trajectory and the determined confidence. The possible future states may be analyzed to determine whether they are recoverable from without crashing. If the possible future states are recoverable, a security certificate may be issued. If some of the possible future states are not recoverable, the semi-autonomous driving vehicle may enter autonomous driving mode and remedial action may be implemented to correct the trajectory of the vehicle to prevent a crash.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    determining a trajectory of a semi-autonomous vehicle based on a first set of data received from one or more vehicle sensors;
    determining a state of the vehicle based on a second set of data received from the vehicle sensors;
    determining an optimal trajectory of the vehicle based on the state of the vehicle;
    inputting the first set of data and the second set of data into a neural network trained as an autoencoder to generate an output of the neural network;
    determining a first level of confidence in the determined state of the vehicle and a second level of confidence in the determined optimal trajectory of the vehicle based on a comparison of the input to the neural network and the output of the neural network;
    determining a plurality of possible future states of the vehicle based on the state of the vehicle, the trajectory of the vehicle, the first level of confidence, and the second level of confidence;
    determining whether a subset of the possible future states of the vehicle are recoverable;
    when it is determined that the subset of the possible future states of the vehicle are recoverable, issuing a security certificate; and
    when it is determined that at least one of the subset of the possible future states of the vehicle are not recoverable:
        retrieving a plurality of recent past states of the vehicle:
        determining a number of the recent past states of the vehicle that comprise dangerous states;
        determining that the recent driving history of a driver is satisfactory when the number of the recent past states of the vehicle that comprise dangerous states is less than a predetermined threshold; and
        upon determination that the recent driving history of the vehicle is not satisfactory entering the vehicle into an autonomous driving mode and autonomously driving the vehicle along the determined optimal trajectory.

2. The method of claim 1, wherein the state of the semi-autonomous vehicle comprises a position of the vehicle with respect to an external environment of the vehicle.

3. The method of claim 1, wherein the state of the vehicle is determined periodically with a certain period, and the possible future states of the vehicle comprise possible states of the vehicle at a time one period in the future.

4. The method of claim 1, wherein the possible future states of the vehicle comprise a Gaussian distribution.

5. The method of claim 4, wherein the subset of possible future states comprises possible future states within a predetermined number of on standard deviations of the mean of the Gaussian distribution.

6. The method of claim 1, wherein a state of the vehicle is recoverable when a probability of the state of the vehicle resulting in a crash is less than a predetermined threshold.

7. The method of claim 1, further comprising:
when it is determined that at least one of the subset of the possible future states of the vehicle are not recoverable, taking remedial action.

8. The method of claim 7, wherein taking remedial action comprises entering the vehicle into an autonomous driving mode and autonomously driving the vehicle along the determined optimal trajectory.

9. The method of claim 1, wherein the plurality of recent past states of the vehicle comprise past states of the vehicle within a predetermined time period.

10. The method of claim 1, wherein a state of the vehicle a dangerous state when a probability of a crash resulting from the state of the vehicle is greater than a second predetermined threshold.

11. A vehicle system for a semi-autonomous vehicle comprising:
one or more vehicle sensors;
one or more processors;
one or more memory modules; and
machine readable instructions stored in the one or more memory modules that, when executed by the one or more processors, cause the vehicle system to:
determine a trajectory of the semi-autonomous vehicle based on a first set of data received from vehicle sensors;
determine a state of the vehicle based on a second set of data received from the vehicle sensors;
determine an optimal trajectory of the vehicle based on the state of the vehicle;
input the first set of data and the second set of data into a neural network trained as an autoencoder to generate an output of the neural network;
determine a first level of confidence in the determined state of the vehicle and a second level of confidence in the determined optimal trajectory of the vehicle based on a comparison of the input to the neural network and the output of the neural network;
determine a plurality of possible future states of the vehicle based on the state of the vehicle, the trajectory of the vehicle, the first level of confidence, and the second level of confidence;
determine whether a subset of the possible future states of the vehicle are recoverable;
when it is determined that the subset of the possible future states of the vehicle are recoverable, issue a security certificate; and
when it is determined that at least one of the subset of the possible future states of the vehicle are not recoverable:
retrieve a plurality of recent past states of the vehicle;
determine a number of the recent past states of the vehicle that comprise dangerous states;
determine that the recent driving history of a driver is satisfactory when the number of the recent past states of the vehicle that comprise dangerous states is less than a predetermined threshold; and
upon determination that the recent driving history of the vehicle is not satisfactory, enter the vehicle into an autonomous driving mode and autonomously drive the vehicle along the determined optimal trajectory.

12. The vehicle system of claim 11, wherein the possible future states of the vehicle comprise a Gaussian distribution, and the subset of possible future states comprises possible future states within a predetermined number of on standard deviations of the mean of the Gaussian distribution.

* * * * *

UNITED STATES PATENT AND TRADEMARK OFFICE
CERTIFICATE OF CORRECTION

| | | |
|---|---|---|
| PATENT NO. | : 11,458,994 B2 | Page 1 of 1 |
| APPLICATION NO. | : 16/834497 | |
| DATED | : October 4, 2022 | |
| INVENTOR(S) | : McGill et al. | |

It is certified that error appears in the above-identified patent and that said Letters Patent is hereby corrected as shown below:

On the Title Page

Pg. 2, Column 1, item (56), other publications, cite no. 3, delete "Sofimax" and insert --Softmax--, therefor.

Signed and Sealed this
Fifteenth Day of November, 2022

Katherine Kelly Vidal
*Director of the United States Patent and Trademark Office*